United States Patent
Morawski et al.

(10) Patent No.: US 10,723,307 B2
(45) Date of Patent: Jul. 28, 2020

(54) AIRBAG MODULE

(71) Applicant: TK HOLDINGS INC., Auburn Hills, MI (US)

(72) Inventors: Benjamin Morawski, Grosse Pointe Farms, MI (US); Christopher Anderson, Harrison Township, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 224 days.

(21) Appl. No.: 15/853,454

(22) Filed: Dec. 22, 2017

(65) Prior Publication Data

US 2019/0193670 A1   Jun. 27, 2019

(51) Int. Cl.
*B60R 21/16* (2006.01)
*B60R 21/2338* (2011.01)
*B60R 21/237* (2006.01)

(52) U.S. Cl.
CPC ........ *B60R 21/2338* (2013.01); *B60R 21/237* (2013.01); *B60R 2021/23384* (2013.01)

(58) Field of Classification Search
CPC .... B60R 21/233; B60R 21/239; B60R 21/203
USPC .................................................. 280/743.2
See application file for complete search history.

(56) References Cited

U.S. PATENT DOCUMENTS

| | | | |
|---|---|---|---|
| 7,614,653 B2 | 11/2009 | Rose et al. | |
| 7,878,537 B2 | 2/2011 | Maertens | |
| 8,500,164 B2 | 8/2013 | Mendez | |
| 8,672,349 B2 | 3/2014 | Mendez et al. | |
| 2005/0225065 A1* | 10/2005 | Fujll | B60R 21/233 280/743.2 |
| 2007/0057487 A1* | 3/2007 | Kim | B60R 21/20 280/728.2 |
| 2008/0007038 A1* | 1/2008 | Fischer | B60R 21/233 280/743.2 |
| 2008/0315567 A1* | 12/2008 | Fischer | B60R 21/233 280/732 |
| 2009/0020991 A1* | 1/2009 | Abe | B60R 21/233 280/739 |
| 2009/0033081 A1* | 2/2009 | Flischer | B60R 21/233 280/743.2 |
| 2009/0224519 A1* | 9/2009 | Fukawatase | B60R 21/233 280/736 |
| 2011/0309605 A1* | 12/2011 | Kumagai | B60R 21/2338 280/741 |
| 2013/0320656 A1* | 12/2013 | Yamada | B60R 21/2338 280/743.2 |

(Continued)

*Primary Examiner* — Toan C To
(74) *Attorney, Agent, or Firm* — Gordon Rees Scully Mansukhani, LLP

(57) ABSTRACT

An airbag module including an inflatable airbag and an inflator. The airbag is formed by a main panel and a pair of side panels and deploys into a position to contact the occupant. The airbag includes a tether connected to the main panel at one end and is anchored proximate to the inflator at the other end. Prior to inflation, the airbag includes a pre-folded portion adjacent to the tether. The airbag is configured so that during an initial stage of the inflation process the tether is fully extended and the pre-folded portion remains folded and during a final stage of the inflation process the tether separates into at least two portions thereby allowing the pre-folded portion to unfold and the airbag to fully deploy.

20 Claims, 5 Drawing Sheets

(56) References Cited

U.S. PATENT DOCUMENTS

2014/0265281 A1\* 9/2014 Witt, Jr. .............. B60R 21/2338
280/743.2

\* cited by examiner

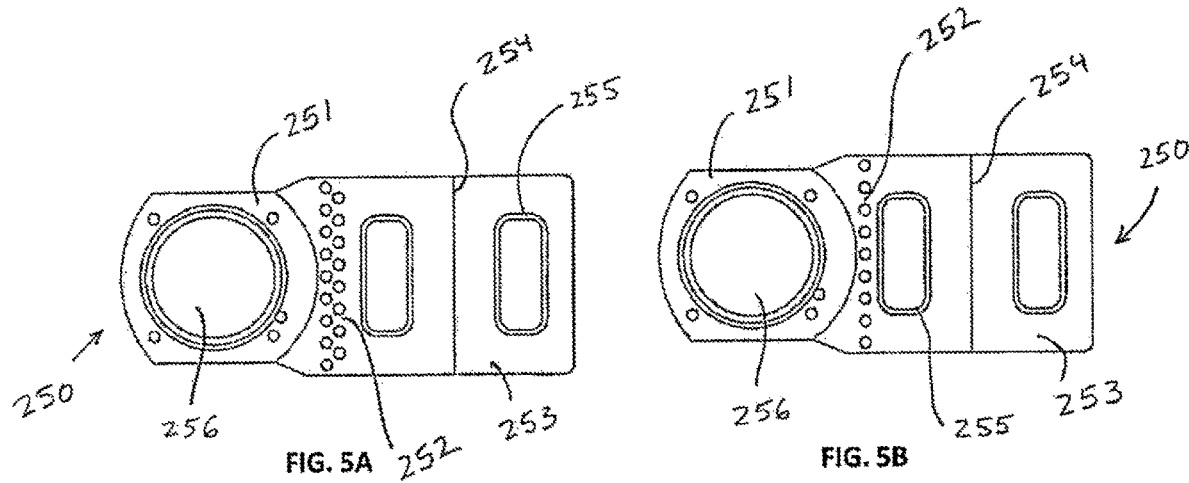
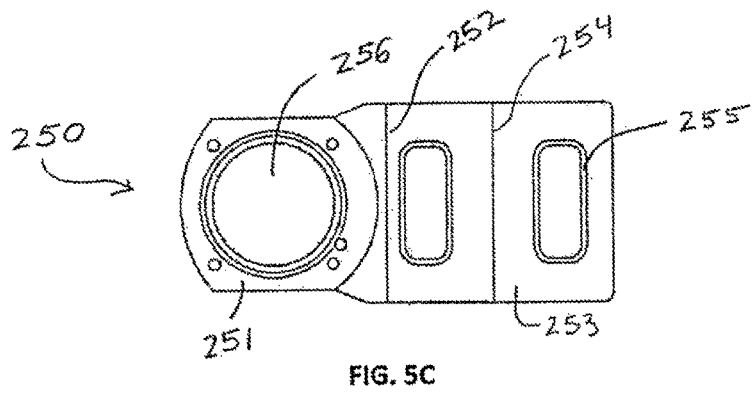
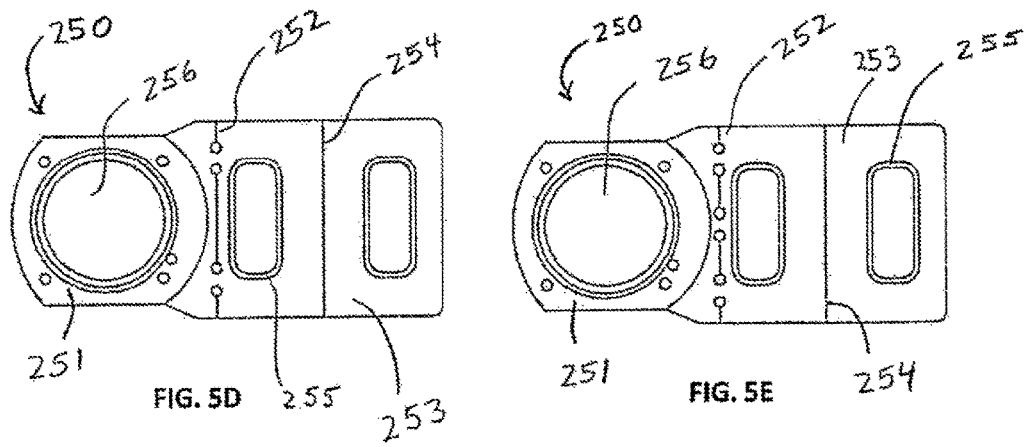

AIRBAG MODULE

BACKGROUND

The present disclosure relates generally to the field of airbags in automotive vehicles. More specifically, this disclosure relates to an airbag configured to include an internal tether for controlling the deployment of the airbag.

Prior to deployment, airbags are typically folded and stored with the inflator as part of the airbag module. In certain circumstances, airbags are folded using an automated folding process. Before beginning the automated folding process it is sometimes necessary to create a pre-fold or tuck in the airbag. The pre-fold or tuck in the airbag is often held in position by sewing the airbag panel using thread designed to tear away. The sewing ensures that the pre-fold or tuck remains in place until the automated folding process begins. The pre-fold or tuck in the airbag may also be necessary in certain airbag designs to ensure proper airbag deployment in the case of an out of position (OOP) occupant. For example, the pre-fold reduces the force imparted onto the out-of-position occupant caused by the inertia of the deploying airbag cushion.

It would be advantageous for an airbag to include a mechanism for providing protection to out-of-position occupants by reducing the force imparted onto the out-of-position occupant caused by the inertia of the deploying airbag cushion that would eliminate the need for the pre-fold and sewing step that occurs before the folding the airbag.

SUMMARY

One disclosed embodiment relates to an airbag module including an inflatable airbag and an inflator configured to provide gas to inflate the airbag. The airbag includes an inflatable chamber formed by a main panel and a pair of side panels. The inflatable chamber is configured to deploy into a position to contact the occupant and is configured to be inflated by a process that includes providing gas from the inflator into the chamber. The airbag includes a tether connected to the main panel at one end and wherein the other end of the tether is anchored proximate to the inflator. The tether includes a weakened portion between the ends of the tether. Prior to inflation, the airbag includes a pre-folded portion adjacent to the tether. The airbag is configured so that during an initial stage of the inflation process of the inflatable chamber the tether is fully extended and the pre-folded portion remains folded. During a final stage of the inflation process the weakened portion tears so that the tether separates thereby allowing the pre-folded portion to unfold and the airbag to fully deploy.

Another disclosed embodiment relates to a method of assembling a three panel airbag passenger side airbag in a storage configuration. The airbag includes two side panels and a center panel. The method includes at least the steps of connecting an internal tether to the main panel at two locations and forming a pre-fold in the main panel by connecting the internal tether to the main panel at two locations of the main panel that are located at positions on the airbag that, when the airbag is fully inflated, are further apart than the length of the tether. The method also may include connecting the side panels to the main panel to form the airbag and then folding the airbag using an automated folding machine.

It is to be understood that both the foregoing general description and the following detailed description are exemplary and explanatory only, and are not restrictive of the invention as claimed.

BRIEF DESCRIPTION OF THE DRAWINGS

Features, aspects, and advantages of the present invention will become apparent from the following description, appended claims, and the accompanying exemplary embodiments shown in the drawings, which are briefly described below.

FIGS. 5A-5E are plan views of different embodiments of an internal tear away tether prior to assembly into the airbag of FIG. 4. The tethers shown in FIGS. 5A-5E are different than the tethers shown in FIG. 4.

DETAILED DESCRIPTION

Airbag systems (e.g., side-impact, front-impact) are located in vehicles to restrain occupants during a dynamic vehicle event (e.g., a front-impact, a side-impact, a rollover event, etc.) in order to reduce the likelihood of injury sustained by the occupant during such events. An airbag system typically includes an inflatable airbag cushion that deploys from a stored configuration, during a dynamic vehicle event, and inflates from gas which is rapidly pushed into the airbag cushion by means of an inflator or other gas generating device. An inflator or module may use a device, such as a pyrotechnic device or other airbag inflation device, to generate gas almost instantaneously and to push the gas at a high volumetric flow rate into the inflatable airbag cushion of the airbag system.

A cushion or airbag may be stored within and deployed from almost anywhere in the vehicle. For example, airbags are stored within and deployed from the inside or outside facing side-surfaces of the seat-back of a seat assembly. Also, for example, airbag cushions are stored within and deployed from within the dashboard or from the steering wheel of the vehicle. Airbags are typically packaged for storage through a process involving folding and/or rolling to compact the airbag in order for it to fit into a small storage volume (e.g., a portion of the seat or instrument panel). Airbags may be used to provide restraint to any occupant located in any seating row (e.g., first, second, third, etc.) or seat configuration (e.g., bucket seat, bench seat, etc.) of a vehicle.

One disclosed embodiment relates to a passenger-side airbag apparatus installed in an instrument panel of a vehicle. In an emergency such as a car crash, the passenger-side airbag expands into a space between a windshield of the vehicle and a passenger sitting in a front passenger seat of the vehicle so as to protect the passenger.

A passenger-side airbag apparatus is generally installed in an instrument panel of a vehicle in a state such that a passenger-side airbag is housed in a container-shape retainer and covered by a lid fixed to the retainer. The retainer has an inflator therein for producing gas to inflate the airbag.

In an emergency such as a car crash, the passenger-side airbag is caused to inflate by the gas flowing from the inflator. The inflating airbag deploys through the instrument panel (e.g., by moving the lid), and expands into a passenger compartment so as to receive a passenger who suddenly moves forward relative to the vehicle due to an impact associated with a car crash or the like.

Figure 1:
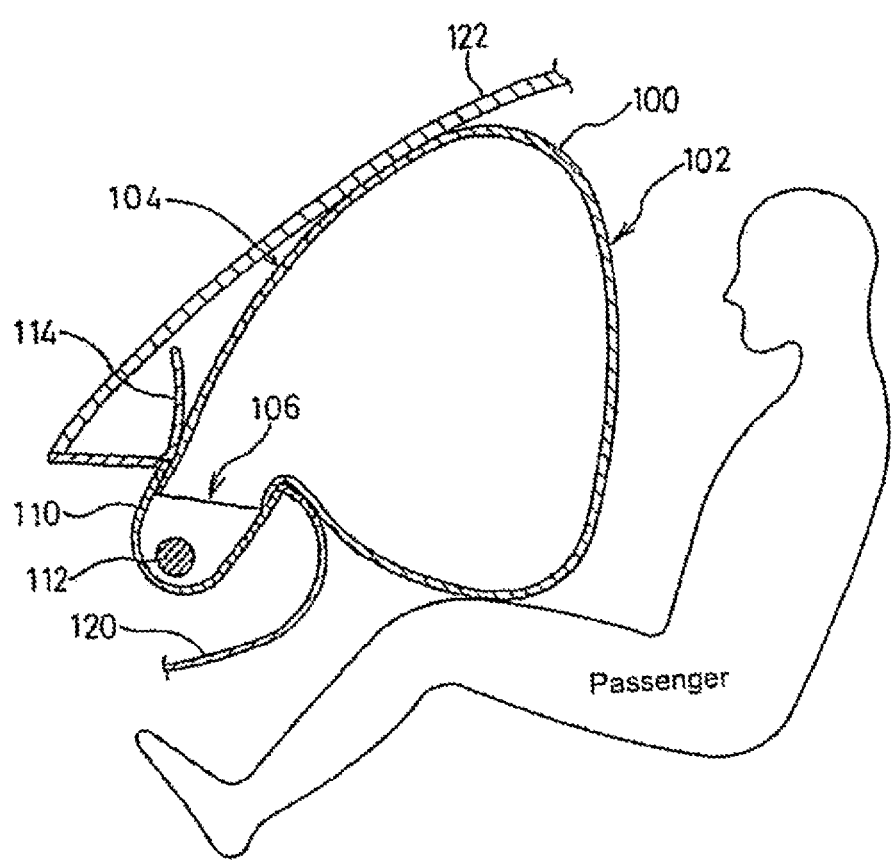
FIG. 1 is a perspective view of a passenger compartment of a vehicle, illustrating a front-impact airbag system installed within the dashboard.

FIG. 1 is a sectional view of a conventional passenger-side airbag apparatus when a passenger-side airbag 100 expands. The expanded passenger-side airbag 100 is tapered toward a rear side (shown in the left side in FIG. 1). The passenger-side airbag 100 has a front part (shown in the right side in FIG. 1) as a passenger surface 102, which faces the passenger and has a sufficient area so as to receive the passenger when the airbag 100 expands in an emergency such as a car crash. Also, when the airbag is expanded, the airbag 100 having an upper part (shown in an upper side in FIG. 1) is served as a windshield surface 104 that faces a windshield 122 installed at a front portion of a car body.

The airbag 100 has an opening 106 at a rear part thereof, a periphery of which is connected to a periphery of an opening disposed at a front part of a container-shape retainer 110. The retainer 110 has an inflator 112 therein, and the gas ejected from the inflator 112 is introduced into the airbag 100 through these openings. The airbag 100 is housed in the retainer 110 in a folded state. Then, a lid 114 may be fixed to the opening of the retainer 110 and the retainer 110 is installed in an instrument panel 120 of the vehicle.

In an emergency such as a car crash, the gas ejected from the actuated inflator 112 inflates the airbag 100, which pushes the lid 114 out. The airbag expands in a passenger compartment.

The airbag 100 discharged into the passenger compartment expands into the space between the windshield 122 and the passenger. The passenger surface 102 is positioned to face the passenger, and the windshield surface 104 is positioned along the windshield 122. When the passenger hits the passenger surface 102 and strongly presses the airbag 100, the windshield surface 104 presses the windshield 122 and is thus securely supported by the windshield so that the airbag 100 reliably receives the passenger.

The airbag 100 has a structure in which three or more panels form the windshield surface 104, the passenger surface 102, and the lower surface facing the instrument panel 120. The right and left surfaces are three-dimensionally sewed so that the airbag 100 has an approximate cone shape and the upper surface thereof faces the windshield 122 when it expands.

Figure 2A:
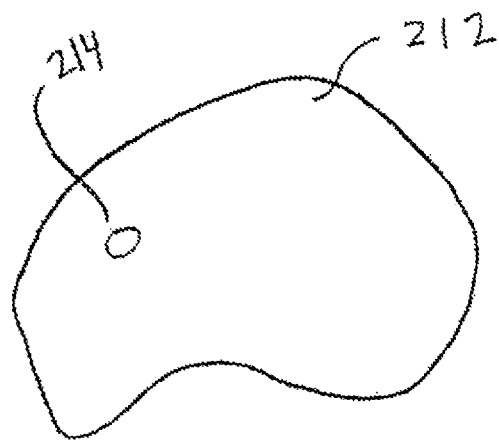
FIGS. 2a and 2b are plan views of a pair of side panels for an airbag prior to assembly.
Figure 2B:
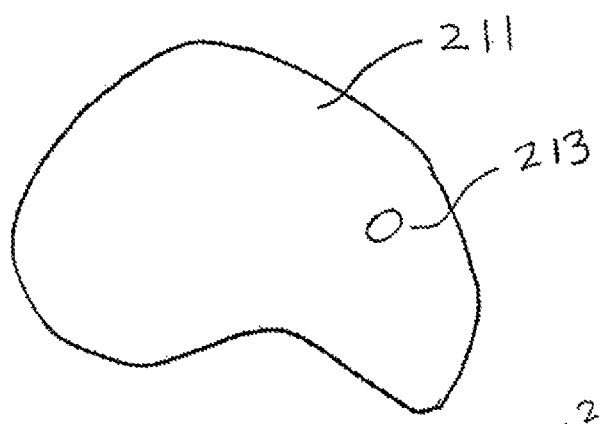
Figure 3:
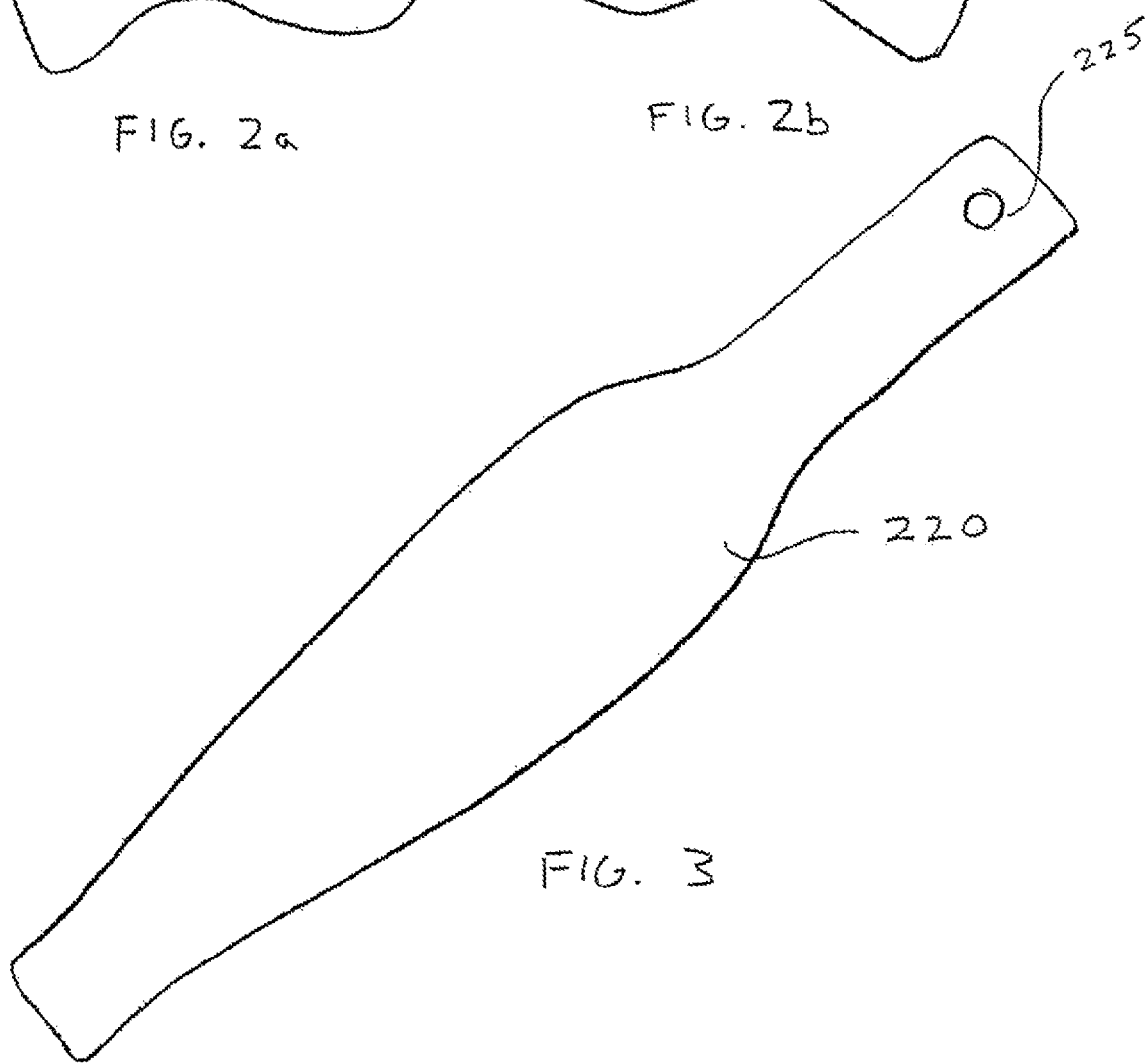
FIG. 3 is a plan view of a center panel of the airbag.

As shown in FIGS. 2a, 2b and 3, an embodiment of an airbag 200 may be formed by three panels. The panels may be fabric panels and include a pair of side panels 211, 212 and a main or center panel 220. The center panel 220 may include an opening 225 for receiving inflation gas from an inflator such as the inflator 112 shown in FIG. 1. Each of the side panels 211, 212 may include one or vent openings 213, 214. The vent openings may be used in conjunction with an active or passive venting mechanism to control the deployment of the airbag.

Figure 4:
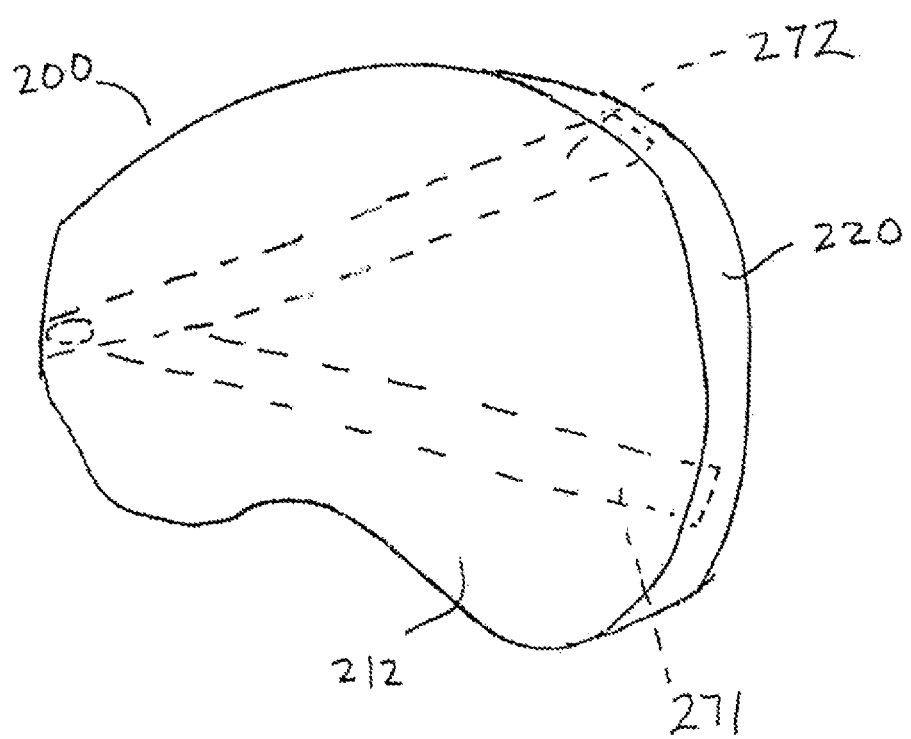
FIG. 4 is a perspective view of an assembled airbag using the panels disclosed in FIGS. 2a, 2b and 3. The view shows optional internal tethers connected to the main panel.

The airbag 200 may include tethers to control the deployment trajectory and position. For example, as shown in FIG. 4, the airbag may include one or more tethers 271, 272 extending from an anchor position proximate to the inflator to a remote position connected to the main panel 220 on or close to the surface contacted by the occupant. The tethers 271, 272 are not frangible and are not configured to separate under tension. The tethers 271, 272 are positioned to control the position of the occupant facing surface of the airbag 200 and main panel 220.

In addition, the airbag 200 may include a tear away tether 250 anchored at one end proximate to the inflator and at another end to the main panel 220. As shown in FIG. 5A, the tear away tether may include a weakened portion 252 configured to separate when a tensile force associated with inflation and deployment of the airbag is applied to the tether 250. At one end 251, the tether is anchored proximate to the inflator and may include an opening 256 surrounding the inflator and/or receiving inflation gas into the airbag.

FIG. 5B discloses an alternative embodiment of a tear away tether that includes a weakened portion 252 with a single row of small openings. FIG. 5C includes an alternative embodiment of the tear away tether that includes the use of frangible stitching or tearable thread as the weakened portion 252. FIGS. 5D and 5E disclose alternative embodiments of the tear away tether in which the weakened portion 252 alternately includes sections of frangible thread or stitching and small openings.

Figure 6:
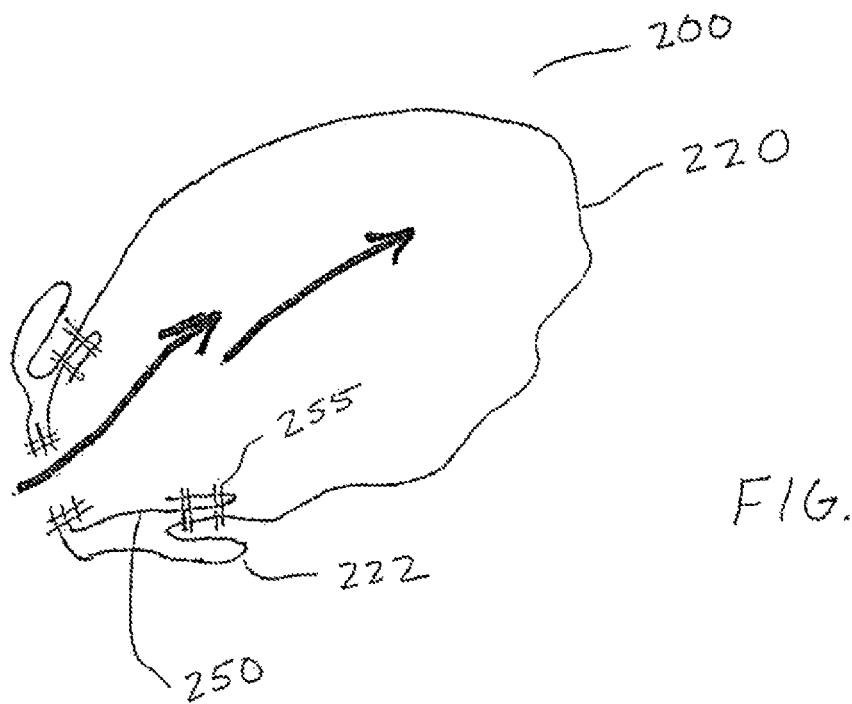
FIG. 6 is a side sectional view of the airbag of FIG. 4 including a pair of internal tethers such as shown in FIGS. 5A-5E prior to full inflation of the airbag and tearing of the tethers.
Figure 7:
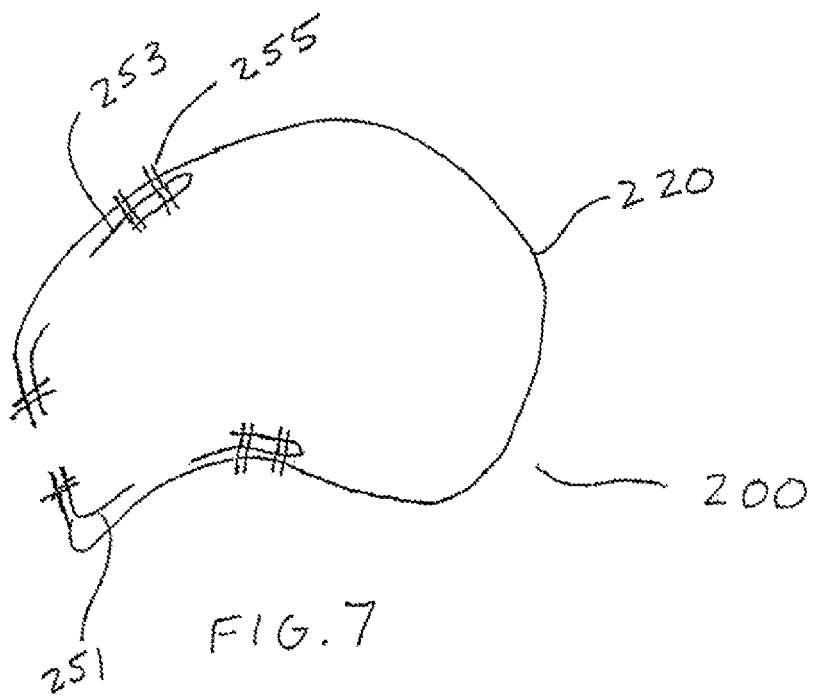
FIG. 7 is a side sectional view of the airbag of FIG. 4 including a pair of internal tethers such as shown in FIGS. 5A-5E after inflation of the airbag and tearing of the tethers.

As shown in FIGS. 6 and 7, the tether 250 may be mounted internally within the airbag 200. The tether is connected at a far end 253 to the main panel 220 by a seam 255. According to one embodiment, the tether may be folded at the far end 253 along a fold line 254 to increase the strength of connection to the main panel 220. Thus, in one embodiment, the seam 255 connects both folded portions of the far end 253 of the tether 250 to the main panel 220. The tether 250 is connected to the airbag so that a portion of the airbag, preferably a portion of the main panel, is gathered as a tucked or folded portion 222. The tucked or folded portion 222 may be referred to as a "pre-tucked" portion because the connection of the tether to the airbag preferably occurs prior to the manual or automated folding process for the entire airbag or cushion.

The airbag 200 may also include a venting system. For example, an active or passive venting system such as disclosed in U.S. Pat. Nos. 8,500,164 and 7,614,653 may be employed with the airbag disclosed herein. Both of the foregoing patents are incorporated by reference herein. The use of the tear away tether in the airbag facilitates the proper placement of the active venting tube and tether mechanism during the folding process.

The use of the tear away tether 250 described above eliminates the need for the airbag panels to be pre-tucked and sewn prior to the automated folding process. The tear away tether 250 is attached to the main panel 220 by a seam and is also retained at the inflator opening 256 by, for example, attaching a portion of the tether to a retainer for the inflator. The length of the tear away tether may be selected to ensure that the tucked or folded portion 222 of the main panel 220 is the appropriate size. The location of the seams on the main panel 220, the length of the tether 250, and the design and position of the tear away or weakened portion 252 of the tether may be chosen to provide varying tear away forces. As a result, the design of the airbag and tether may be modified to provide an airbag or cushion that only partially deploys when full deployment is not required, and/or slows down the release of the cushion to thereby prevent the full force of the inflator/cushion from interacting with the occupant in certain situations.

The tear away tether 250 can also aid in providing certain directed deployment trajectories by creating a delay in the filling of the lower portion of the cushion, allowing the upper portion to fill more quickly. Thus, the tether 250 may allow the upper portion of the cushion to deploy earlier towards the occupant and provide for earlier contact with the head of the occupant, if desired. For example, FIGS. 6 and 7 show two tear away tethers 250, but the airbag may only include a single lower tether. Alternatively, the design of the upper and lower tethers may differ to provide for different deployment trajectories such as described above.

FIGS. 6 and 7 disclose the operation of the airbag 200 and tether 250 during deployment. As shown in FIG. 6, the inflation gas fills the airbag (see the arrows indicating the gas flow from the inflator) and the tether 250 prevents the pre-tucked or pre-folded portion 222 of the airbag from being subject to the tensile force resulting from the filling of the airbag 200. Thus, during the initial stage of filling of the airbag 200, the pre-tucked or pre-folded portion 222 is considered a slack portion not subject to tensile force. As shown in FIG. 7, after the tensile force on the tether 250 exceeds the load bearing capabilities of the weakened portion 252, the tether 250 separates and the pre-tucked or pre-folded portion 222 is allowed to extend during the final stage of filling the airbag 200. The tear away tether 250 is connected to the main panel 220 at a location relatively close to the inflator. The connection location of the tear away tether is at a portion of the main panel that will not be in contact with the occupant during the initial stage of filling the airbag.

The provision of the tether 250 eliminates the need for the steps of folding and sewing the main airbag to provide a pre-tuck portion prior to the automated folding process. Thus, by providing the tear away tether 250, the folding process for the airbag may be simplified with reduced operations, resulting in a savings of both time and cost. In addition, in situations where an airbag is folded manually, the provision of the tear-away tether would eliminate the inherent variability of the pre-tuck that would occur when the folding is performed manually. The tear away tether provides for producing the same pre-tuck on a repeatable basis.

The tear away tether may provide for improved deployment in situations involving a RFIS (rear facing infant seat), because the tear away tether can provide a tailored cushion deployment which would control the trajectory of the airbag as it interacts with the RFIS. Similarly, the tear away tether can be used to tailor the trajectory of an airbag for situations involving an out of position or small occupant (e.g., five percent female) or child so that uniform loading of the head and chest is accomplished. The airbag deploys with an initial volume that is smaller and restricted allowing for tailored deployment for RFIS, five percent female, and out of position occupant. The tear away tether may be used with numerous airbag and cushion designs including multi-chamber designs. The airbag design disclosed herein also provides for improved manufacturing because it allows for the ability to automatically machine fold the cushion while providing for tailored performance for certain conditions such as OOP, RFIS and 5 percent female.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbags and tethers as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle comprising:
   an inflatable airbag; and
   an inflator configured to provide gas to inflate the airbag;
   wherein the airbag includes an inflatable chamber formed by a main panel positioned to deploy into a position to contact the occupant and wherein the inflatable chamber includes an inflator opening for receiving gas provided by the inflator;
   wherein the airbag includes a internal tether connected to the main panel at one end and wherein the other end of the internal tether is fixed adjacent to the inflator opening; and wherein the tether is connected to the main panel at a location that ensures when the tether is fully extended due to the deployment of the airbag the main panel includes a tucked portion that is not tensioned, and wherein the tether includes a weakened portion that is configured to tear so that the tether separates during the deployment of the airbag so that the one end of the tether is no longer connected to the other end of the tether thereby allowing the airbag to fully deploy eliminating the tucked portion.

2. The airbag module of claim 1, wherein the tether is connected to a lower portion of the main panel so that an upper portion of the airbag fills prior to a lower portion of the airbag.

3. The airbag module of claim 1, wherein the internal tether includes a first internal tether, and a second internal tether, wherein the second tether is connected to the main panel at a location that ensures when the second tether is fully extended due to the deployment of the airbag the main panel includes a second tucked portion that is not tensioned, and wherein the second tether includes a weakened portion that is configured to tear so that the second tether separates during deployment of the airbag allowing the airbag to fully deploy thereby eliminating the second tucked portion.

4. The airbag module of claim 3, wherein the first internal tether is connected to a bottom portion of the main panel and the second tether is connected to a top portion of the main panel.

5. The airbag module of claim 1, wherein the other end of the tether includes an opening that surrounds the inflator.

6. The airbag module of claim 1, wherein the one end of the tether is folded resulting in two folded portions and wherein both of the folded portions are connected to the main panel.

7. The airbag module of claim 1, wherein the weakened portion of the tether includes an plurality of openings in the tether.

8. The airbag module of claim 1, wherein the internal tether includes a first internal tether, and a second internal tether extending from a position proximate the inflator to a position on the main panel proximate to a position on the main panel configured to contact the occupant when the airbag deploys.

9. The airbag module of claim 8, wherein the first internal tether is fixed to the main panel at a location not configured to contact the occupant during an initial stage of filling the airbag.

10. An airbag module for protecting an occupant of a vehicle comprising:
an inflatable airbag; and
an inflator configured to provide gas to inflate the airbag;
wherein the airbag includes an inflatable chamber formed by a main panel and a pair of side panels and wherein the inflatable chamber deploys into a position to contact the occupant, wherein the inflatable chamber is configured to be inflated by a process that includes providing gas from the inflator into the chamber;
wherein the airbag includes a tether connected to the main panel at one end and wherein the other end of the tether is anchored proximate to the inflator, wherein the tether includes a weakened portion between the ends of the tether; and
wherein, prior to inflation, the airbag includes a pre-folded portion adjacent to the tether and wherein the airbag is configured so that during an initial stage of the inflation process of the inflatable chamber the tether is fully extended and the pre-folded portion remains folded and wherein during a final stage of the inflation process the weakened portion tears so that the tether separates so that the one end of the tether is no longer connected to the other end of the tether thereby allowing the pre-folded portion to unfold and the airbag to fully deploy.

11. The airbag module of claim 10, wherein the tether is connected to a lower portion of the main panel so that an upper portion of the airbag fills prior to a lower portion of the airbag.

12. The airbag module of claim 10, further comprising a second tether connected to the main panel at one end and wherein the other end of the second tether is anchored proximate to the inflator, wherein the second tether includes a weakened portion between the ends of the tether.

13. The airbag module of claim 12, wherein the airbag includes a second pre-folded portion adjacent to the second tether, and wherein the airbag is configured so that during an initial stage of the inflation process for the chamber the second tether is fully extended and the second pre-folded portion remains folded and wherein during a final stage of the inflation process the weakened portion of the second tether tears so that the second tether separates thereby allowing the second pre-folded portion to unfold and the airbag to fully deploy.

14. The airbag module of claim 10, wherein the other end of the tether includes an opening that surrounds the inflator.

15. The airbag module of claim 14, wherein the one end of the tether is folded resulting in two folded portions and wherein both of the folded portions are connected to the main panel.

16. The airbag module of claim 15, wherein the weakened portion of the tether includes an plurality of openings in the tether.

17. The airbag module of claim 16, further comprising a second tether extending from a position proximate the inflator to a position on the main panel proximate to a position on the main panel configured to contact the occupant when the airbag deploys.

18. The airbag module of claim 17, wherein the second tether is located in the inflatable chamber.

19. The airbag module of claim 18, wherein the first mentioned tether is fixed to the main panel at a location not configured to contact the occupant during the initial stage of filling the airbag.

20. An airbag module for protecting an occupant of a vehicle comprising:
an inflatable airbag; and
an inflator configured to provide gas to inflate the airbag;
wherein the airbag includes an inflatable chamber formed by a main panel positioned to deploy into a position to contact the occupant and wherein the inflatable chamber includes an inflator opening for receiving gas provided by the inflator;
wherein the airbag includes an internal tether connected to the main panel at one end and wherein the other end of the internal tether is fixed adjacent to the inflator opening;
wherein the tether is connected to the main panel at a location that ensures when the tether is fully extended due to the deployment of the airbag the main panel includes a tucked portion that is not tensioned, and wherein the tether includes a weakened portion that is configured to tear so that the tether separates during the deployment of the airbag allowing the airbag to fully deploy thereby eliminating the tucked portion; and wherein the one end of the tether is folded resulting in two folded portions and wherein both of the folded portions are connected to the main panel.

* * * * *